United States Patent [19]

Bergen

[11] Patent Number: 4,481,540

[45] Date of Patent: Nov. 6, 1984

[54] TELEVISION CAMERA COMPRISING A FOCUSING ARRANGEMENT

[75] Inventor: Franciscus H. M. Bergen, Eindhoven, Netherlands

[73] Assignee: U.S. Philips Corp., New York, N.Y.

[21] Appl. No.: 381,086

[22] Filed: May 24, 1982

[30] Foreign Application Priority Data

Jun. 26, 1981 [NL] Netherlands ............... 8103090

[51] Int. Cl.³ .................. H04N 5/26; H04N 5/30
[52] U.S. Cl. ........................... 358/227; 358/224
[58] Field of Search ........... 358/224, 227, 162, 218, 358/181

Primary Examiner—John C. Martin
Assistant Examiner—Victor R. Kostak
Attorney, Agent, or Firm—Thomas A. Briody; William J. Streeter; Charles E. Quarton

[57] ABSTRACT

A television camera in which an electronic view-finder is further used for adjusting an optimum focusing. The picture signal is then applied to the view-finder via a switching device, and that during the presence of an aperture correction signal. Outside the occurrence of this aperture correction signal the supply of a picture signal which has been made unsharp may be affected, or the supply thereof may be interrupted. Adjusting the optimum focusing on the basis of the picture on the viewer screen is then facilitated.

5 Claims, 1 Drawing Figure

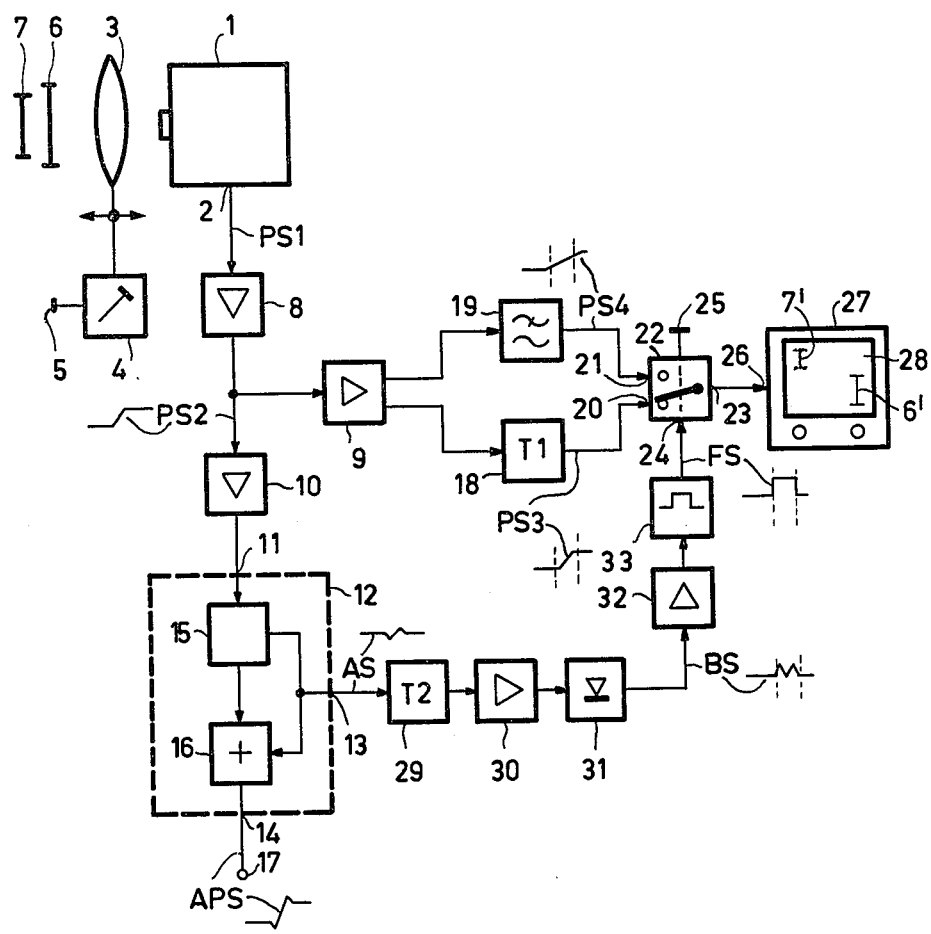

TELEVISION CAMERA COMPRISING A FOCUSING ARRANGEMENT

The invention relates to a television camera comprising a focusing arrangement, a television pick-up device and an electronic view-finder which has a signal input which is coupled to an output of the pick-up device for supplying a picture signal, the view-finder incorporating a display screen to display the applied picture signal.

The electronic view-finder is not only used by an operator of the television camera to see which portion of a scene is recorded by the camera, but the picture displayed on the displayer viewer screen may also be used for focusing adjustment purposes. The operator then changes the focus setting until the optimum picture sharpness is reached in that portion of the displayed picture at which the operator wants to focus. Parts of the scene which are closer to or further away from the camera show with a lesser degree of sharpness in the displayed picture.

Owing to the small size of the display screen of the view-finder compared to the much larger sizes of the screens of television display devices, differences between details on the viewer screen are less sharp and less clear than those on the television picture display screens. Consequently, searching the optimum focusing for a predetermined scene portion is an arduous procedure, wherein the optimum must be found by changing the focusing settings around this optimum. In practice it then appears that the viewer screen may give the operator the impression that he has found the optimum focusing for the selected scene portion, while the picture on the screen of a television display device clearly shows that this is not the case.

It is an object of the invention to provide a television camera wherein the electronic view-finder can be utilized in an easier way for obtaining an optimum focusing setting for a selected scene portion. According to the invention, a television camera is therefore characterized in that the said output of the pick-up device for supplying the picture signal is coupled to the signal input of the view-finder via a switching device, the switching device having a switching input which is coupled to an output for carrying an aperture correction signal provided by an aperture correction circuit incorporated in the camera, the switching device transmitting the picture signal during the presence of the aperture correction signal.

The supply of the picture signal to the view-finder is controlled by the aperture correction signal and results in a picture on the viewer screen having only relevant information in the region where optimum focusing has been obtained, as the aperture correction signal is only present in the regions where picture signal transitions corresponding to picture details occur and these transitions are more obvious according as focusing is better. Only those contours of the original picture at which focusing was more or less optimum are shown on the viewer screen, it then being easy to obtain the optimum focusing setting by adjusting the focusing, the sharpest contours then being obtained, there where they are required.

For the event that the operator wants to have the possibility to observe on the viewer screen also the field of view of the camera during adjusting the optimum focusing, a camera embodiment is possible which is characterized in that the switching device is in the form of a change-over device having a first and a second signal input and an output, the first and the second signal input, respectively being coupled to the output of the pick-up device via a delay device and a low-pass filter, respectively, and the output being coupled to the signal input of the electronic view-finder, the delay device having a time delay which is equal to the time delay of the low-pass filter.

In the viewer image corresponding to the field of view of the camera the scene portion focused at is displayed sharply, while scene portions which are closer to or further away are displayed less sharp due to the use of the low-pass filter. Thus, it is easily observable which scene portion has been focused at and to what extent. The optimum focusing adjustment can thus be easily obtained.

So as to obtain in a simple manner a switching signal having a pulse of a desired duration, a television camera in accordance with the invention is characterized in that the switching input of the switching device is coupled to the output of the aperture correction circuit via a monostable multivibrator circuit.

A desired starting moment of the pulse in the switching signal can then be obtained in a television camera which is characterized in that a delay device is provided in series with the multivibrator circuit.

Furthermore, a switching signal can be obtained from both ascending and descending signal edges in the aperture correction signal in a television camera which is characterized in that the monostable multivibrator circuit is preceded by a rectifier circuit for full-wave rectification.

The invention will now be further described by way of example with reference to the accompanying FIGURE, which shows by means of a block schematic circuit diagram a television camera in accordance with the invention.

In the FIGURE reference numeral 1 denotes a television pick-up device having an output 2 for supplying a picture signal PS1. At the pick-up device 1, which comprises one or more pick-up tubes or solid-state pick-up devices an objective 3 is drawn which is movable to or from the pick-up arrangement 1 by means of a device 4, which incorporates a manual control 5. The camera shown in the FIGURE thus comprises a focusing arrangement (3, 4, 5). By means of the focusing arrangement (3, 4, 5) a scene is recorded in which numerals 6 and 7 denote two scene portions. Let it be assumed that the scene portion 6 is closer to the pick-up arrangement 1 than the scene portion 7, focusing having been done at the scene portion 6.

The output 2 is connected to the input of an amplifier circuit 8. The output of the amplifier circuit 8, which carries a picture signal PS2 is connected to the inputs of amplifier circuits 9 and 10. The FIGURE shows the signal PS2 as a function of time with a signal transition between two signal levels. The output of the amplifier circuit 10 is connected to the input 11 of an aperture correction circuit 12. The circuit 12 has an output 13 for carrying an aperture correction signal AS, shown next to it, and an output 14 for carrying an aperture-corrected picture signal APS, shown next to it. In the drawing, the circuit 12 comprises an aperture correction signal shaper 15 and an adder stage 16. The signal shaper 15 applies a picture signal, not shown, and the aperture correction signal AS, shown to the adder stage 16. The aperture-corrected picture signal APS becomes available at an output terminal 17 for further processing in the television camera. The specific construction of the circuit 12 is not further defined. Instead of the construction of the circuit 12 shown in the drawing a high-pass filter may be used to separate the signal AS. For the sake of completeness, it should be noted that the aperture-corrected picture signal APS shown in FIGURE is delayed by one picture element period with respect to the picture signal PS2.

The amplifier circuit 9 has two outputs, one output being connected to a signal input 20 of a switching device 22 via a delay device 18 and the other output being connected to a signal input 21 of the switching device 22 via a low-pass filter 9. In the FIGURE, the switching device 22 is shown in the form of a change-over device, at all times one of the two signal inputs 20 or 21 being connected to a signal output 23. The switching device 22 incorporates a switching input 24 and a manual control 25 by means of which the device 22 can be adjusted to a fixed position, wherein the signal input 20 is connected to the signal output 23. Picture signals PS3 and PS4 are shown at the respective inputs 20 and 21. Relative to the signal PS2 the signal PS4 has a smoothed signal transition, which is caused by the low-pass filter 19. The signal PS2 is delayed by the delay device 18 by a period of time T1, as a result of which the delayed signal PS3 and the smoothed signal PS4 have the 50% point of the signal transistion at the same instant. Thus, the delay device 18 has a time delay which is equal to the time delay produced by the low-pass filter 19.

The output 23 of the switching device 22 is connected to a signal input 26 of an electronic view-finder 27 of the television camera. In the drawing the view-finder 27 has a display or viewer screen 28 on which scene portions 6 and 7 are shown, which are indicated by 6' and 7'. Let it be assumed that focusing has been effected on the scene portion 6, for that reason the image 6' being sharp and the image 7' being unsharp in the drawing.

The view-finder 27 may be used for its principal task, that is to say searching the field of view of the television camera by adjusting the switching device 22 to the fixed position by means of the manual control 25, the signal input 20 then being connected to the output 23.

The switching input 24 of the switching device 22 is coupled to the output 13 of the aperture correction circuit 12 and that via a series arrangement of a delay device 29, an amplifier circuit 30, a rectifier circuit 31 for full-wave rectification, an amplifier circuit 32 and a monostable multivibrator circuit 33. The output of the rectifier circuit 31 carries the signal BS shown next to it and the output of the circuit 33 carries a signal $F_S$ derived therefrom and which is shown in the drawing. Relative to the signal AS the signals FS and BS are delayed by a period of time T2, the signal FS having a pulse of a duration within which the signal transition in the signal PS3 occurs. During the pulse period, extending from the example, 0.5 to 1 $\mu s$, the switching device 22 is in the position shown in the drawing, the signal input 20 then being connected to the output 23. Outside the pulse period the signal input 21 is connected to the output 23. The result is that steep signal transitions are displayed as such on the viewer screen 28 (signal PS3), while signal transitions which are less steep are first smoothed and thereafter displayed (signal PS4). The steep signal transitions are then present in those scene portions at which focusing has been effected (scene portions 6 and 6'). A change in the position of the focusing arrangement (3, 4, 5) will cause scene portions which are further away from or closer to the pick-up device to be displayed sharper on the viewer sceen 28.

The delay device 29 may be omitted. However, the use of this delay device enables the possibility to choose a desired starting moment of the pulse in the signal FS. The pulse duration in the signal FS is determined by the circuit 33 and may be adjusted optionally.

In the embodiment, shown in the FIGURE, of the television camera the further field of view of the camera is seen unsharp during adjusting of the optimum focusing at the scene portion 6 by means of the manual control 5 of the focusing arrangement (3, 4, 5). The use of the delay device 18 and the multivibrator circuit 33 is then a requirement for forming the composite picture on the viewer screen 28 via the (change-over) switching device 22.

In a further possible embodiment the switching device (22) may be in the form of an on/off switching device which transmits the picture signal PS2 only during the presence of the switching signal FS which is derived from the aperture correction signal AS. Then only the contours of the scene portion 6' can be seen on the viewer screen 28, which contours will be sharpest when focusing is optimum.

Instead of using the rectifier circuit 31 with full-wave rectification thoughts may go towards the use of a monostable multivibrator circuit (33) which responds to ascending as well as to descending signal edges in the aperture correction signal AS.

In the signal coupling paths the amplifier circuits 8, 9, 10, 30 and 32 are shown, which are used for signal matching, but which are further not relevant to the invention.

What is claimed is:

1. A television camera comprising a focusing arrangement, a television pick-up device and an electronic view-finder which has a signal input which is coupled to an output of the pick-up device for supplying a picture signal, the view-finder incorporating a display screen for displaying the applied picture signal, characterized in that the said output of the pick-up device for supplying the picture signal is coupled to the signal input of the view-finder via a switching device, the switching device having a switching input which is coupled to an output for carrying an aperture correction signal provided by an aperture correction circuit incorporated in the camera, the switching device transmitting the picture signal during the presence of the aperture correction signal.

2. A television camera as claimed in claim 1, characterized in that the switching device is in the form of a change-over device having a first and a second signal input and an output, the first and second signal input, respectively being coupled to the output of the pick-up device via a delay device and a low-pass filter, respectively and the output being coupled to the signal input of the electronic view-finder, the delay devices having a time delay which is equal to the time delay of the low-pass filter.

3. A television camera as claimed in claim 1 or claim 2, characterized in that the switching input of the switching device is coupled to the output of the aperture correction circuit via a monostable multivibrator circuit.

4. A television camera as claimed in claim 3, characterized in that a delay device is arranged in series with the multivibrator circuit.

5. A television camera as claimed in claim 3 or 4, characterized in that the monostable multivibrator circuit is preceded by a rectifier circuit for full-wave rectification.

* * * * *